United States Patent [19]
Masutani

[11] Patent Number: 5,940,169
[45] Date of Patent: Aug. 17, 1999

[54] IMAGE FRAME SELECTING DEVICE FOR PHOTOGRAPHIC PRINTER

[75] Inventor: Hironori Masutani, Wakayama-ken, Japan

[73] Assignee: Noritsu Koki Co., Ltd., Wakayama, Japan

[21] Appl. No.: 08/916,921

[22] Filed: Aug. 22, 1997

[30] Foreign Application Priority Data

Aug. 23, 1996 [JP] Japan .................................... 8-221972

[51] Int. Cl.⁶ .......................... G03B 27/52; G03B 27/44; G03F 3/10
[52] U.S. Cl. ................................ 355/40; 355/54; 358/527
[58] Field of Search .................... 355/40, 41, 54, 355/35; 358/527, 403

[56] References Cited

U.S. PATENT DOCUMENTS

| | | | |
|---|---|---|---|
| 4,134,105 | 1/1979 | Stadler | 354/105 |
| 4,294,537 | 10/1981 | Laska et al. | 355/40 |
| 5,218,455 | 6/1993 | Kristy | 358/403 |
| 5,477,353 | 12/1995 | Yamasaki | 358/487 |
| 5,671,072 | 9/1997 | Umemoto | 358/527 |
| 5,745,220 | 4/1998 | Okazaki et al. | 355/41 |

FOREIGN PATENT DOCUMENTS

| | | |
|---|---|---|
| 0363935 | 4/1990 | European Pat. Off. . |
| 2-103027 | 4/1990 | Japan . |
| 8-110583 | 4/1996 | Japan . |
| 2286944 | 8/1995 | United Kingdom . |

Primary Examiner—David M. Gray
Assistant Examiner—Peter Kim
Attorney, Agent, or Firm—Smith Patent Office

[57] ABSTRACT

An image frame selecting device for a photographic printer comprises an image processing device for reading an image frame of a negative film and for multiple image frames in a multi-frame illustrative pattern on a monitor; an illustrative pattern switching device for changing the multi-frame illustrative patterns; a plurality of selection keys disposed corresponding to the arrangement of each image frame in the multi-frame illustrative pattern; and a selection key control device for assigning the selecting function of the image frames displayed on the monitor to only the keys whose positions correspond respectively to those of image frames in the multi-frame illustrative pattern selected by the illustrative pattern switching device.

4 Claims, 9 Drawing Sheets

IMAGE FRAME SELECTING DEVICE FOR PHOTOGRAPHIC PRINTER

BACKGROUND OF THE INVENTION

1. Field of the Invention

The present invention relates to an image frame selecting device for a photographic printer for selecting a specific image frame from a plurality of image frames displayed on a monitor.

2. Discussion of the Related Art

In a photographic printer, a picture is printed by exposing image frames of a developed negative film onto a printing film. This printing process frequently demands image frame selection because the process involves such operations as selecting the image frame to be printed, correcting the exposure condition and inputting the number of pieces to be printed. In printing the image frames of the negative film onto photographic printing paper, the photographic printer detects the reference point to the image frame of the negative film with an optical sensor etc., positions the image frame to be printed with a conveying mechanism to a printing aperture provided in the film conveying passage, and prints the necessary pieces of photographic printing paper under modified exposure conditions, if necessary. Various methods have been known for selecting the image frame to be printed.

Japanese Patent Laid-Open Publication No. 103027/1990 discloses a method which, in selecting the image frame to be printed among various pieces of film, allows a position of the selected image frame to be checked by the use of a selection key whose number and arrangement correspond to those of the image frame formed on the piece of film. By this method, the arrangement of the selection keys corresponds to that of the image frames on the piece of film, and this improves the operation efficiency relating to the selection when the exact location of the selected image frame on the piece film is already known. However, when the location of the selected image frame on the negative piece of film is not known exactly, the piece of film which has already been set on the negative film carrier must be dismounted to confirm the exact location by looking straight at the piece of film.

Furthermore, Japanese Patent Laid-Open Publication No. 110583/1996 discloses another method which allows the user to designate consecutively the image frames to be printed by using a selection key whose arrangement pattern is similar to that of image frames printed as an index print in order to confirm the selected image frame by the index prints. This method is a more exact selecting operation compared with that of the method previously described, because the image frame is confirmed by the index prints and the arrangement of the selection keys is similar to that of the image frames. This method, however, always requires the user to prepare index prints of the negative film to be printed. Therefore, when the index prints are not prepared, the selection according to this method cannot be utilized.

In order to select image frames by confirming the selected image frames visually, another method is adopted in which a processed image frame signal is displayed on a monitor after being read by a scanner installed on the film conveying passage. A cursor displayed on the monitor is moved to the selected image frame by a cursor key. However, it is annoying for skilled workers to move the cursor consecutively with the cursor key. A pointing device like a mouse or a touch panel, instead of a cursor key, may be easier to use for unskilled workers, but, when considering a quick selecting operation of the image frame by the skilled worker, the shift period from an image frame to the next remote one becomes critical. When a pointing device like a mouse or a touch panel is installed adding to the input keys on a keyboard for operating a photographic printer, the apparatus may have a defect of increasing the complexity and expense of the apparatus.

The object of the present invention is to provide an image frame selecting device for a photographic printer, which solves the problems in the prior art and allows a skilled worker to confirm visually the image frame and to select it quickly, without complexity of use and without increasing the expense of the photographic printer.

In order to solve the problems described above, an image frame selecting device for a photographic printer according to the present invention comprises an image processing means for reading an image frame of a negative film and for displaying plural kinds of image frames in a multi-frame illustrative pattern on a monitor; an illustrative pattern switching means for changing the multi-frame illustrative patterns; a plurality of selection keys disposed corresponding to the arrangement of each image frame in the multi-frame illustrative pattern; and a selection key control means for assigning the selecting function of the image frames displayed on the monitor to only the keys whose positions correspond respectively to those of image frames in the multi-frame illustrative pattern selected by the illustrative pattern switching means.

This device allows the desired image frame to be selected among several image frames displayed on a monitor in a multi-frame illustrative pattern determined by the illustrative pattern switching means, by using a selection key whose position corresponds to that of desired image frame. Furthermore, even if the multi-frame illustrative pattern is changed, the selecting function is automatically re-assigned to each selection key, so that each location of selection keys will correspond to that of each image frame after the pattern is changed.

Accordingly, the image frame can similarly be selected by the selection keys whose arrangement pattern corresponds to that of each image frame displayed on the monitor. Therefore, using a group of selection keys whose arrangement pattern always corresponds to that of the image frames makes it possible to select the image frames quickly even if the multi-frame illustrative pattern of image frames on the monitor is changed.

In some preferred embodiments of the present invention, an identification device is provided to identify the selection keys which are assigned to the image frame selecting functions by a selection key control means. This gives an advantage which allows the selection keys assigned to the selections of the image frames in the present multi-frame illustrative pattern to be easily confirmed. As an identification device it is preferable to use a display device like an LED.

When the selection key itself is equipped with the above-mentioned identification device, it will provide an advantage of a smaller arrangement space of the selection keys. When the identification device is arranged in the vicinity of the selection key, it will also give a similar advantage by adding such configuration as a notch to a part of each selection key.

In addition to those advantages, when the ten-key keypad is made to serve also as the image frame selection keys in another preferred embodiment of the present invention, no special space is required for the selection keys so as to give more freedom in keyboard design.

When the selection keys are combined with other function keys and an assignment-cancel key to cancel the selecting functions assigned to the selection keys, the printing operation can be executed more efficiently because other operations such as data input may be started by pressing the assignment-cancel key immediately after the selecting operation of image frame has been finished.

BRIEF DESCRIPTION OF THE DRAWINGS

The above and other objects and features of the present invention will be clearly understood from the following description with respect to preferred embodiments thereof when considered in conjunction with the accompanying drawings, wherein the same reference numerals have been used to denote the same or similar parts or elements, and in which.

DETAILED DESCRIPTION OF THE PREFERRED EMBODIMENTS

Figure 1:
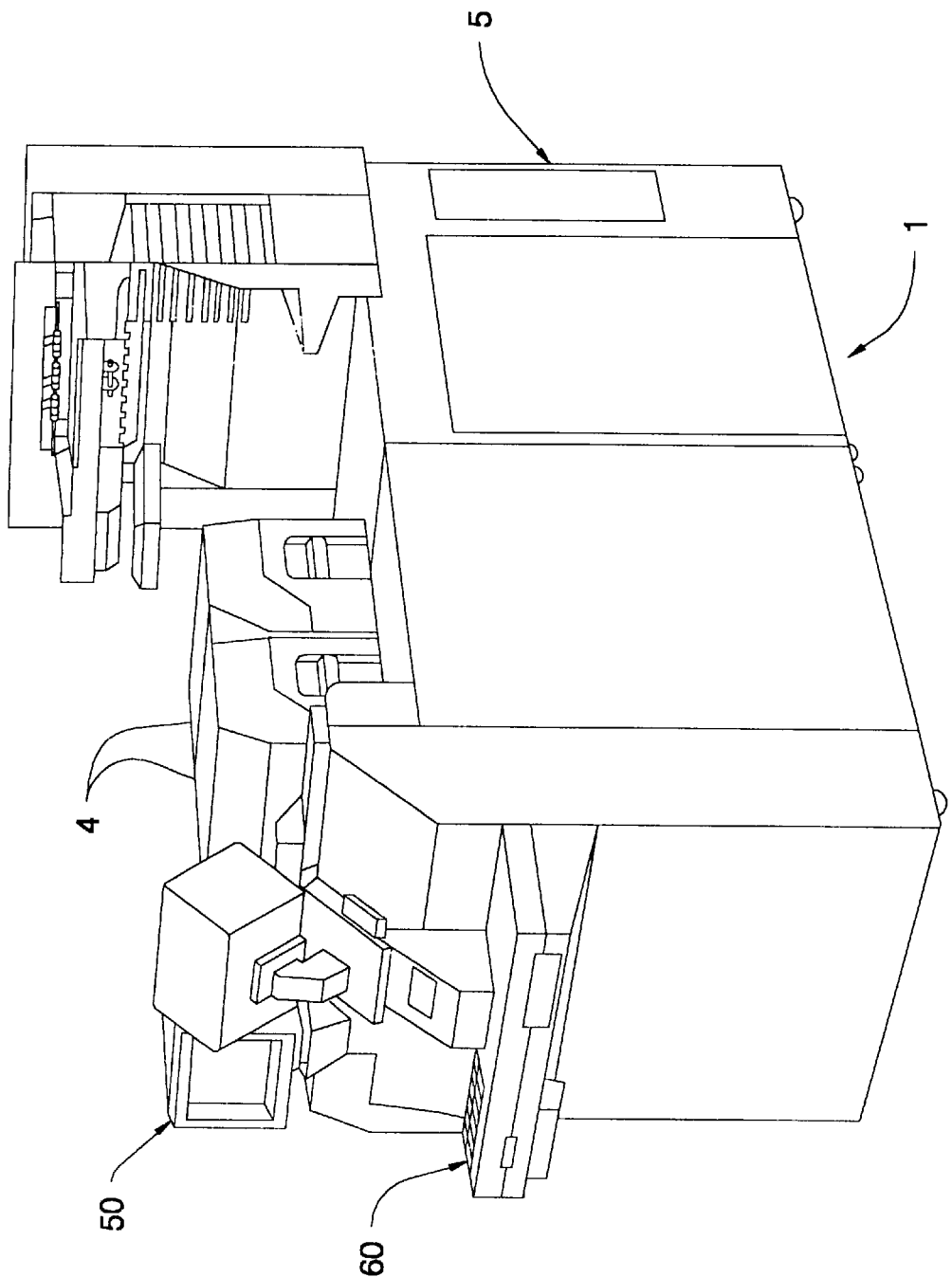
FIG. 1 is a perspective view of a photographic printer equipped with an image frame selecting device according to the present invention.
Figure 2:
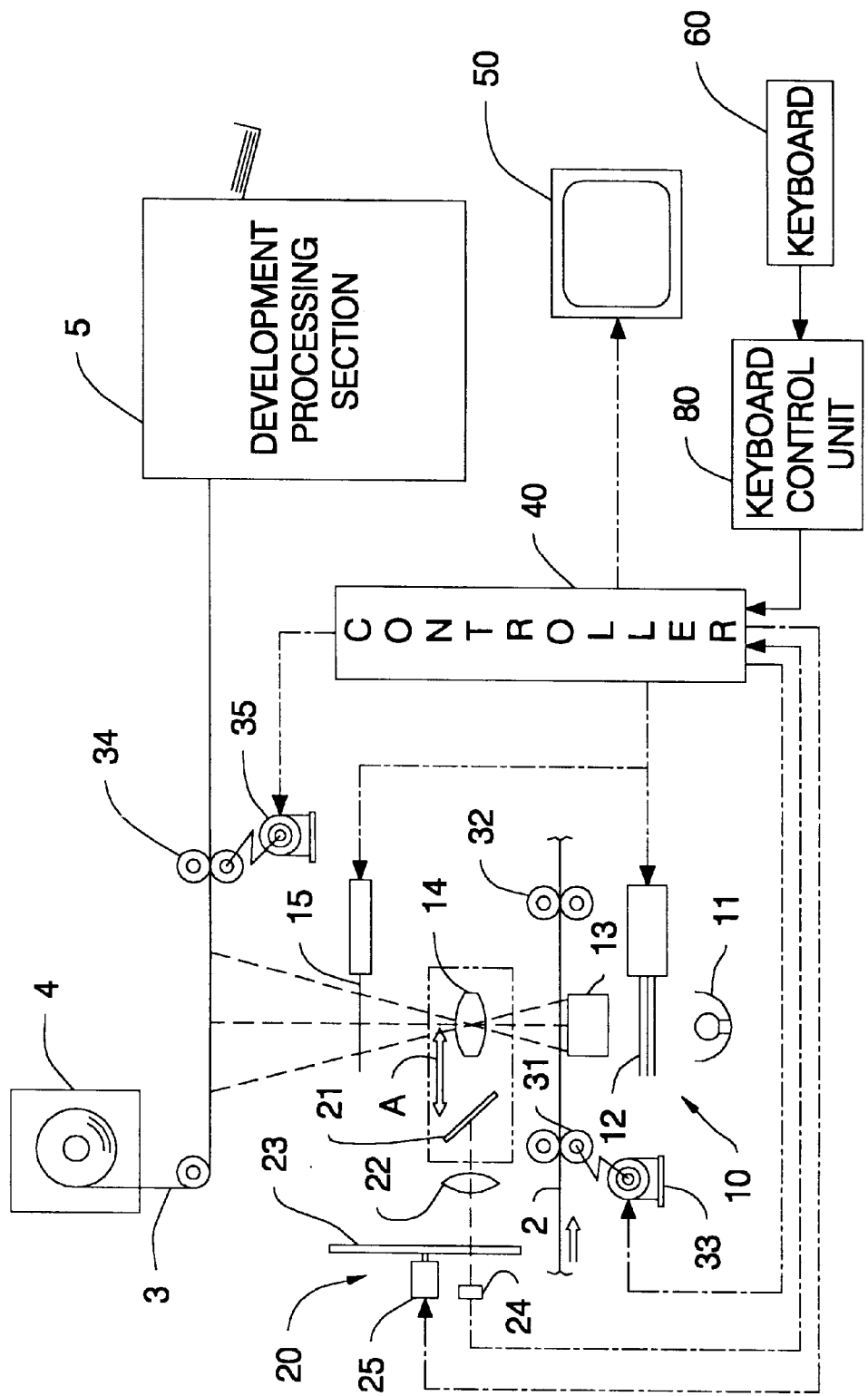
FIG. 2 is a block diagram of the photographic printer shown in FIG. 1.

FIG. 1 shows a perspective view of a photographic printer equipped with an image frame selecting device of the present invention. FIG. 2 shows a basic block diagram of the photographic printer. The photographic printer 1 comprises a projecting/exposing section 10 for projecting and exposing image frames formed on a negative film (hereafter referred to as film) 2 onto a photographic printing paper 3 as a photosensitive material; a development processing section 5 for developing the printing paper 3 exposed at the projecting/exposing section 10; and a controller 40 for controlling an operation of each section of the photographic printer 1, wherein the controller 40 is connected to a keyboard 60 through a keyboard control unit 80 to allow various operational commands to be input and is also connected to a monitor 50 displaying various data. The printing paper 3 rolled in the printing paper magazine 4 is pulled out therefrom so as to be exposed at the projecting/exposing section 10, developed at the development processing section 5, and then cut into the size equal to that of one image frame and sent out.

The projecting/exposing section 10 comprises in its optical path: a light source 11; a light modulating filter 12 for balancing the light color irradiated on the film 2; a light diffusing barrel 13 for mixing the light having passed the light modulating filter 12; a printing lens unit 14 for forming the image of the film 2 on the printing paper 3; and a shutter 15.

A reading means 20 for reading the image information on the film 2 is installed on the side of the printing lens unit 14.

The reading means 20 comprises a reflecting mirror 21; a lens 22; a rotatable color filter 23 which is composed of color filters of R (red), G (green), and B (blue) disposed circumferentially and driven by a motor 25; and a CCD image sensor 24, wherein the reflecting mirror 21, together with the printing lens unit 14, is mounted on a movable table which is not illustrated.

The reciprocating slide motion, in the direction shown by the arrow A in FIG. 2, of the movable table with the printing lens unit 14 and the reflecting mirror 21 allows the position of the movable table to be selectively switched so as to cause either of the printing lens unit 14 or the reflecting mirror 21 to be positioned in the exposing optical path.

When the printing lens unit 14 is positioned in the optical path, the image information of the film 2 is formed onto the printing paper 3 through printing lens unit 14. When the reflecting mirror 21 is positioned in the optical path, the image of the film 2 is reflected by the reflecting mirror 21 and formed on a light receiving surface of the CCD image sensor 24 by the lens 22.

The CCD image sensor 24 detects the image information of the film 2 by dividing it into three colors, R, G, and B, through the rotation of rotating color filter 23, and then it sends the detected signals to the controller 40. Namely, when the reflecting mirror 21 is positioned in the optical path, the image of the film 2 is read by the CCD image sensor 24. When the printing lens 14 is positioned in the optical path, the image of film 2 is projected and exposed onto the printing paper 3.

With regard to the optical path, in the upstream and downstream portions of the film conveying passage are installed a pair of rollers 31 and a pair of rollers 32 respectively, which are driven by a motor 33. In the printing paper conveying passage, downstream of the exposing position for the printing paper 3, are installed a pair of rollers 34 and a motor 35 for driving the rollers 34. At the development processing section 5, though not illustrated in FIG. 2, is installed a plurality of tanks filled with processing solution for developing the printing paper 3 which has been exposed, and the printing paper 3 is developed while it consecutively passes through those tanks.

Figure 3:
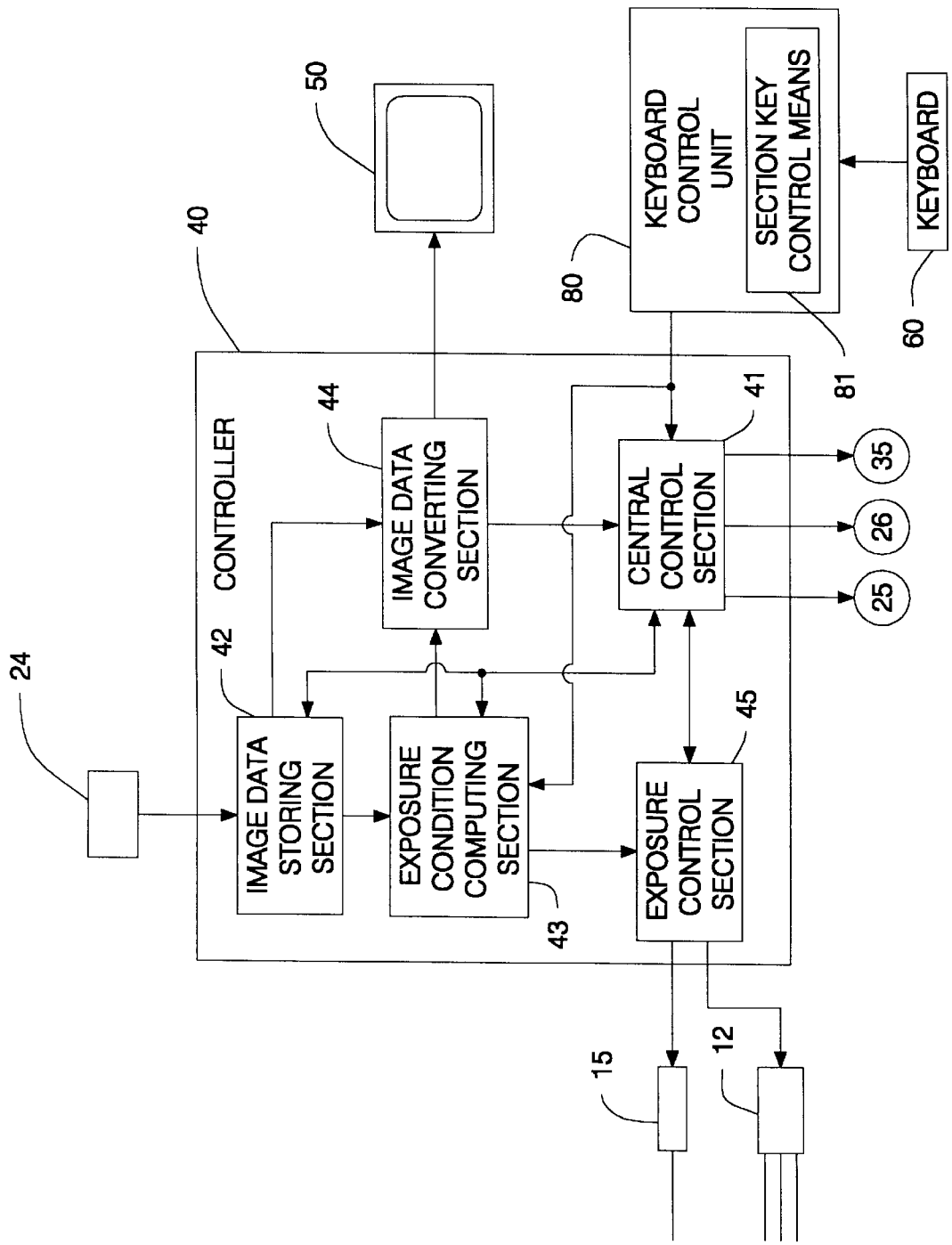
FIG. 3 is a block diagram of a controller.

The controller 40, as shown in FIG. 3, comprises an image information storing section 42 for storing the image data read by the CCD image sensor 24; an exposure condition computing section 43 for determining the exposure condition by utilizing the image data in the image information storing section 42; an exposure control section 45 for exposing the printing paper 3 by controlling the operation of the light modulating filter 12 and the shutter 15 in the projecting/exposing section 10 according to the exposure condition determined by the exposure condition computing section 43; an image information converting section 44 for converting the image data read out from the image information storing section 42, according to the exposure condition determined by the exposure condition computing section 43, into the image data to be displayed on the monitor 50; and a central control section 41 for controlling the operation of the image information storing section 42, the exposure condition computing section 43, the image information converting section 44 and the exposure control section 45 according to the stored programs and the commands from the keyboard 60.

Various parameters which are registered in the image information converting section 44 and provided for the conversion processing such as the conversion of the image information from negative image to positive image are set so that the parameters enable the image, which is equivalent to that formed on the printing paper 3 when the image frame of the film 2 is projected and exposed onto the printing paper 3 according to the exposure condition determined by the exposure condition computing section 43, to be displayed on the monitor 50 in a predetermined multi-frame illustrative pattern which will be described later. The exposure condition computing section 43 corrects the exposure condition in response to the increase/decrease command from the keyboard 60 for a light exposure of each color of Y (yellow), M (magenta), and C (cyan), or for an average light exposure corresponding to the change of the photographic density.

The image information storing section 42 can store the full image data which is read by the CCD image sensor 24 from a single order of image frames of film 2, so that the image information converting section 44 can read out the image data of plural image frames from the image information storing section 42, process and convert them, and then simultaneously display them on the monitor 50 in a specific multi-frame illustrative pattern.

Figure 4:
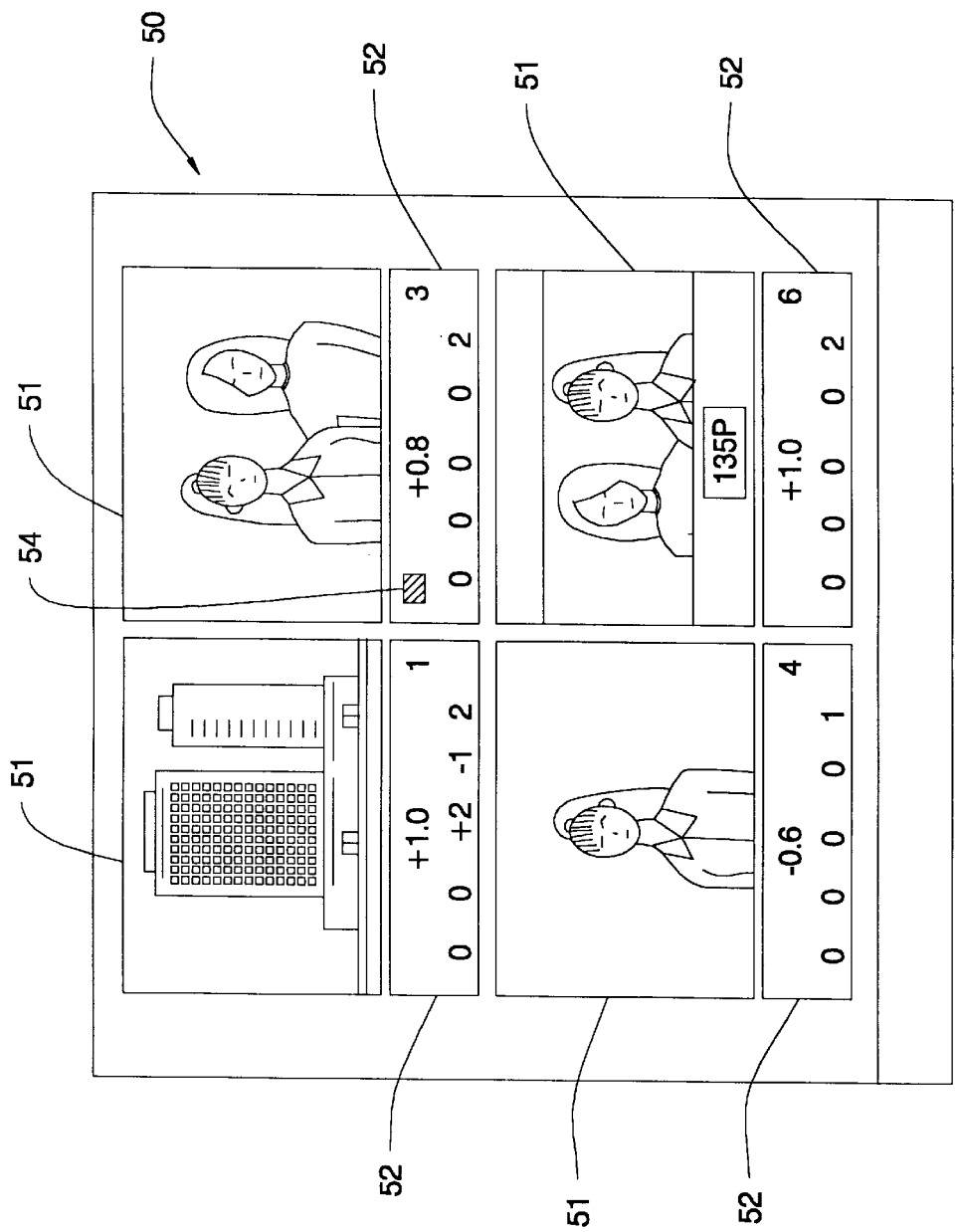
FIG. 4 shows a 4-frame illustrative pattern displayed on a monitor.
Figure 5:
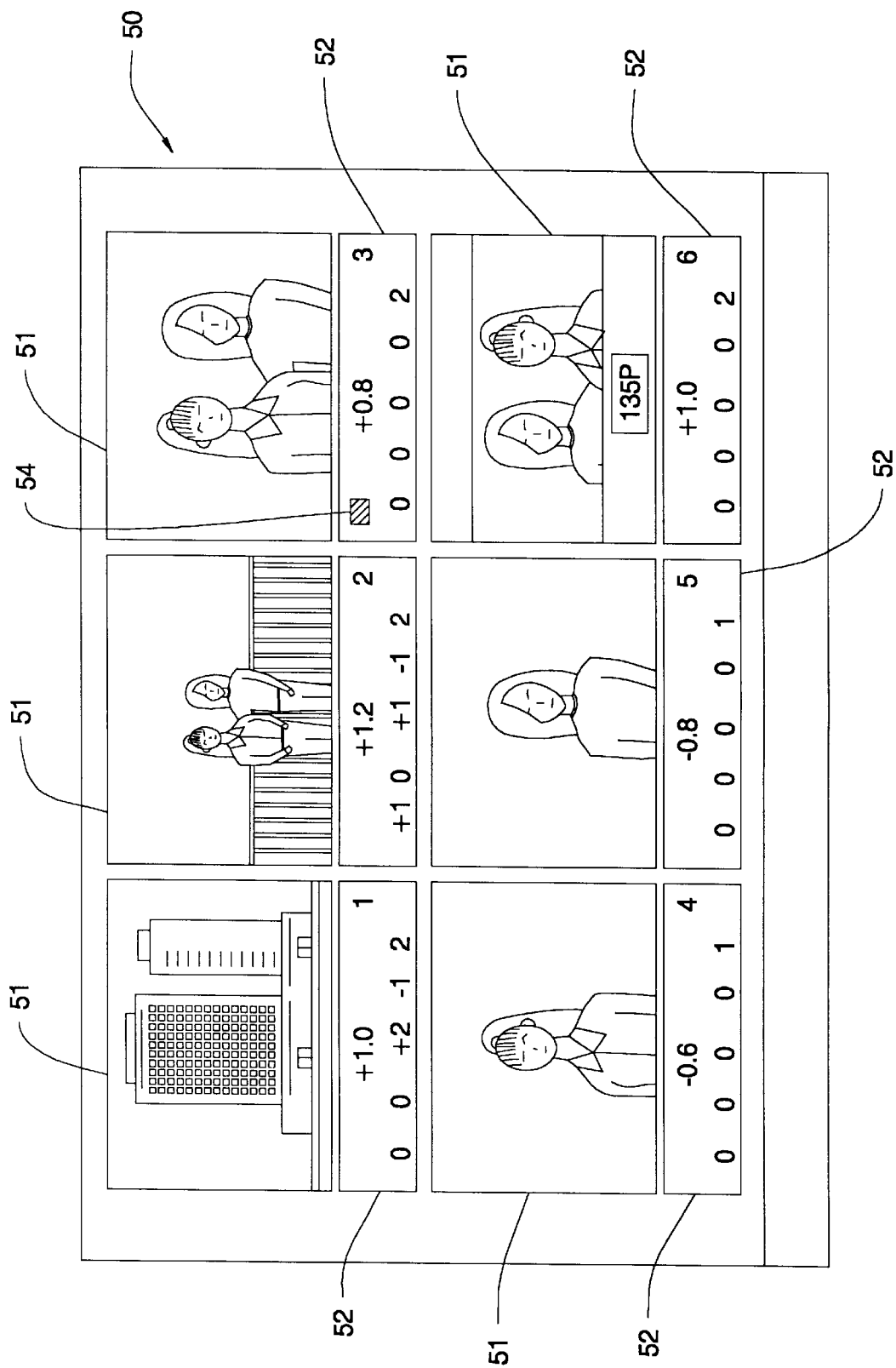
FIG. 5 shows a 6-frame illustrative pattern displayed on a monitor.
Figure 6:
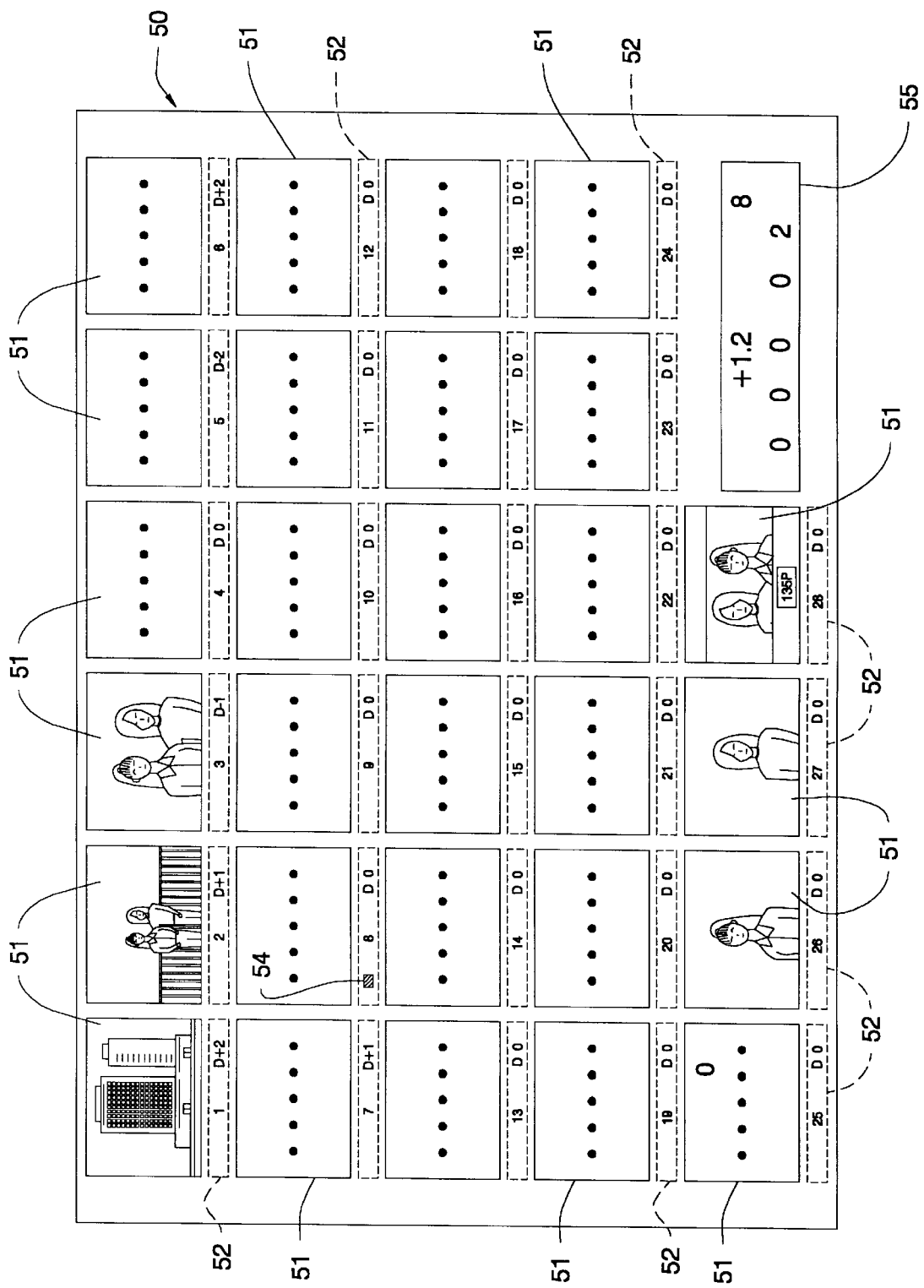
FIG. 6 shows a 28-frame illustrative pattern displayed on a monitor.

The multi-frame illustrative pattern to display image plural image frames on the monitor 50 includes a 4-frame illustrative pattern to display four image frames 51 as shown in FIG. 4, a 6-frame illustrative pattern to display six image frames 51 as shown in FIG. 5, a 28-frame illustrative pattern to display 28 image frames 51 as shown in FIG. 6, and a 40-frame illustrative pattern, not shown, to display 40 image frames 51. As is known from the above description, the controller 40 works as an image processing means for processing the image frame signals read out from the film 2 to generate a plurality of multi-frame illustrative patterns for displaying plural image frames on the monitor 50.

Figure 7:
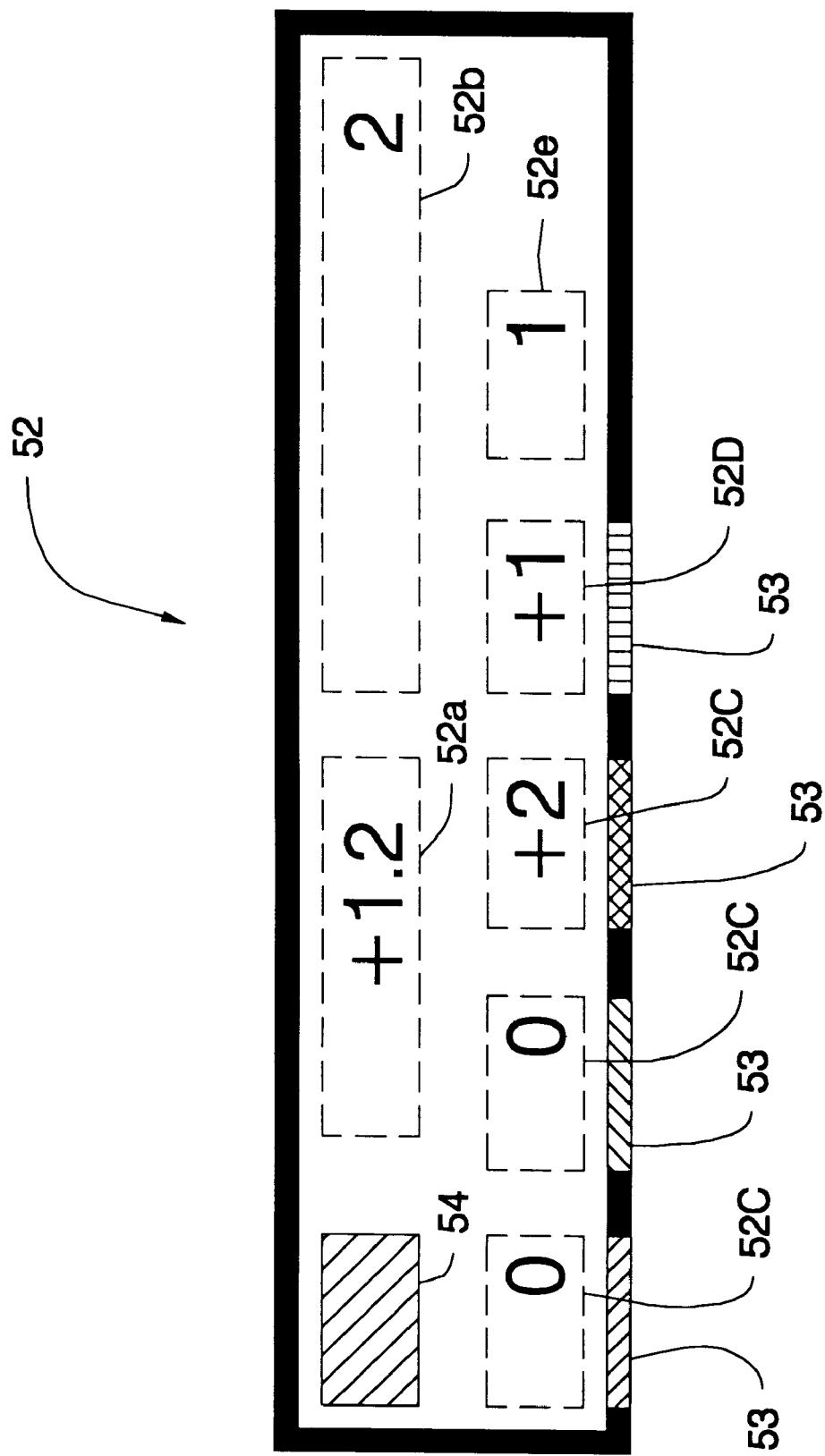
FIG. 7 shows a data indication area in a multi-frame illustrative pattern.

In the 4-frame illustrative pattern, the four image frames 51 are displayed in the order of that on the film 2. In a data indication area 52 located below each image frame 51 is arranged, as shown in FIG. 7, a photographic density column 52*a* for indicating the average photographic density determined by the photometric quantities measured by the CCD image sensor 24, a frame number column 52*b* for indicating the frame number of the frame, a correction value column 52*c* for indicating each correction value input from the keyboard 60 for each color of Y, M, and C, a density key correction value column 52*d* for indicating the correction command input from the keyboard 60 for the average increase/decrease of light exposure corresponding to the change of photographic density, and a printing number column 52*e* for indicating the number of pieces to be printed input from the keyboard for each image frame.

Furthermore, on the perimeter of the data indication area 52 are displayed guide marks 53 for the colors of Y, M, C and white. In this embodiment, on the upper left corner of the data indication area 52 is displayed a cursor 54 to indicate that the image frame is subject to a command from the keyboard 60, but the cursor 54 may be changed into various forms, for example, into a configuration so as to partially or entirely surround the objective image frame.

As is clearly known from a comparison between FIG. 4 and FIG. 5, although the 6-frame illustrative pattern is not described here because of its similarity to the 4-frame illustrative pattern, the size of each image frame 51 in the 6-frame illustrative pattern is smaller than that of the 4-frame illustrative pattern.

In the 28-frame illustrative pattern, 28 image frames 51 are displayed in the order they are on the film 2. As seen in FIG. 6, in the data indication area 52 located below each image frame 51 are displayed, the frame number and the correction value for the average increase/decrease of the light exposure corresponding to the change of photographic density, together with the cursor 54. Furthermore, as shown in FIG. 7, on the lower right corner in the display screen of the monitor 50, a data indication area 55 is located to display the data of the current image frame, but the cursor 54 is not displayed in this data indication area 55. The image frame 51 on the monitor 50 having an oblong size of an image shows that the photo in its image frame was taken in panoramic mode.

Figure 8:
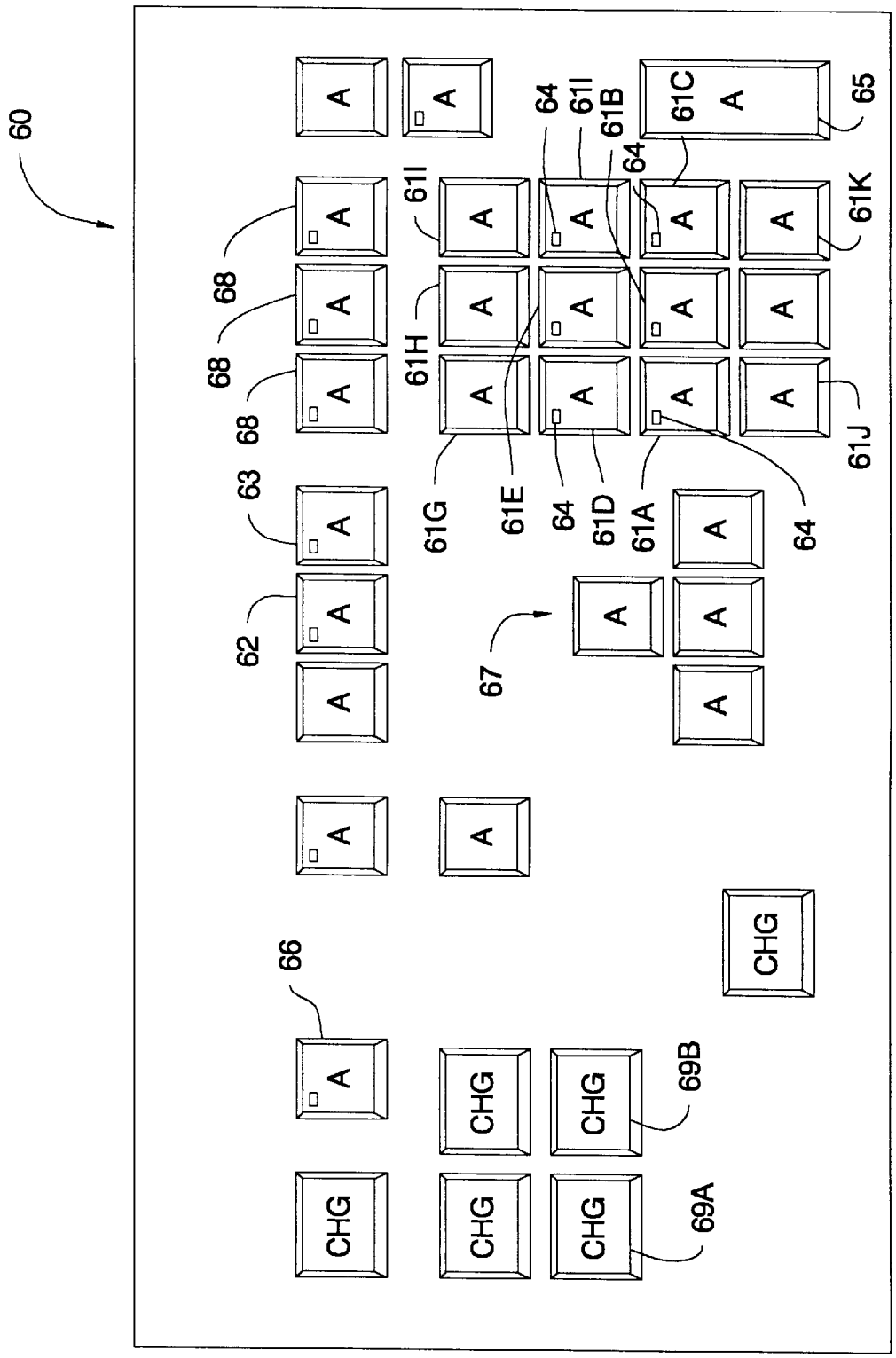
FIG. 8 is a plan view of a keyboard according to the present invention.

FIG. 8 shows a plan view of the keyboard 60. The output signals from keyboard 60 are sent to the central control section 41 through a keyboard control unit 80 which as a keyboard interface. The keyboard 60 is equipped with various keys for operating the photographic printer 1, and the keys relating to the present invention will now be described.

On the right area of the keyboard 60 are disposed a "1" key 61*a*, a "2" key 61*b*, a "3" key 61*c*, a "4" key 61*d*, a "5" key 61*e*, a "6" key 61*f*, a "7" key 61*g*, a "8" key 61*h*, a "9" key 61*i*, and a "0" key 61*j*, which comprise the ten-keys in a conventional arrangement. To add to that, an "A" key 61*k* is disposed below the "3" key 61*c*. The upper central area of the keyboard 60 includes a "MENU" key 62 and a "SHIFT" key 63.

Switching to the desired multi-frame illustrative pattern is executed by pressing the "MENU" key 62 to display the menu screen on the monitor 50 and selecting the desired multi-frame illustrative pattern therefrom. Accordingly, the basic components in the illustrative pattern switching means in this embodiment are the "MENU" key 62, the controller 40 and the monitor 50, but a menu method like this may be replaced by a command method through key inputs.

On the upper left corner of each key touch face of the six keys from the "1" key 61*a* to the "6" key 61*f* is installed an LED 64 as an identification device. For example, in the 4-frame illustrative pattern shown in FIG. 4, the LEDs 64 of the "1" key 61*a*, "2" key 61*b*, "4" key 61*d*, and the "5" key 61*e* are lit to indicate that only these four keys are available for selecting from the four image frames 51 displayed on the monitor 50. Namely, pressing the "1" key 61*a* moves the cursor 54 to the image frame 51 in the lower left corner in FIG. 4 and the image frame 51 in that position is selected. Similarly, the "2" key 61*b* is pressed to select the image frame 51 in the lower right in FIG. 4, the "4" key 61*d* is pressed to select the image frame 51 in the upper left in FIG. 4, and the "5" key 61*e* is pressed to select the image frame 51 in the upper right in FIG. 4. Namely, the arrangement of four image frames 51 shown in FIG. 4 corresponds to that of the 4 selection keys composed of the "1" key 61*a*, "2" key 61*b*, "4" key 61*d*, and the "5" , key 61*e*, so that the image frame can be selected easily.

In the 6-frame illustrative pattern shown in FIG. 5, the LEDs 64 of the "1" key 61*a*, "2" key 61*b*, "3" key 61*c*, the "4" key 61*d*, "5" key 61*e*, and the "6" key 61*f* are lit to indicate that only these six keys are available for selecting from the six image frames 51 displayed on the monitor 50. In this case also, the arrangement of six image frames 51 is the same as that of the corresponding selection keys, as in the case of the 4-frame illustrative pattern. In the menu method, when the illustrative pattern is switched from 4-frame to 6-frame or vice versa, the LEDs 64 of the keys for selecting the image frame 51 are lit by a selection key control means installed in the keyboard control unit 80.

In the so-called multi-frame illustrative pattern such as the 28-frame illustrative pattern or the 40-frame illustrative pattern, it is impossible to make an one-to-one correspondence between the image frames 51 displayed on the monitor 50 and the ten-keys so another method is used. This method includes a frame number that is input by the ten-keys and fixed by a specific key. For example, when the image frame 51 with the frame number 13 is selected, at first, the "1" key 61a and the "3" key 61c are pressed in this order and, then, a "YES" key 65, located to the right of the ten-key keypad, is pressed to fix the input 13. By these inputs, the controller 40 recognizes that the image frame 51 with the frame number 13 has been selected.

The ten-key keypad is used for inputting various data other than that for selecting the image frames 51 as mentioned above. For example, when the "SHIFT" key 63 is pressed, the LEDs 64 are turned off and each of the ten key works as a function key. When a "REPT" key 66 located in the left area of the keyboard 60 is pressed, the LEDs 64 are turned off and each of the ten keys works as a simple numerical key. Namely, the "SHIFT" key 63 and the "REPT" key 66 work as an assignment-cancel key to cancel the image frame selecting function assigned to the ten-key keypad. To add to that, four arrow keys 67 that are disposed in the lower central area of the keyboard 60 for moving the cursor 54 frame by frame in different directions in a conventional manner in order to select the image frame 51. For the selected image frame 51, besides the inputting of the number of printings through the ten-keys, the correction value for the exposure condition is also input, and, for this purpose, a plurality of color designation keys 68 consisting of a "Y" key, a "M" key, and a "C" key which designate the colors of Yellow, Magenta, and Cyan respectively, are placed in the upper area of the ten-keys, and a "−1" key 69a for decrementing the correction value and a "+1" key 69b for incrementing the correction value are placed in the left area of the keyboard 60.

Figure 9:
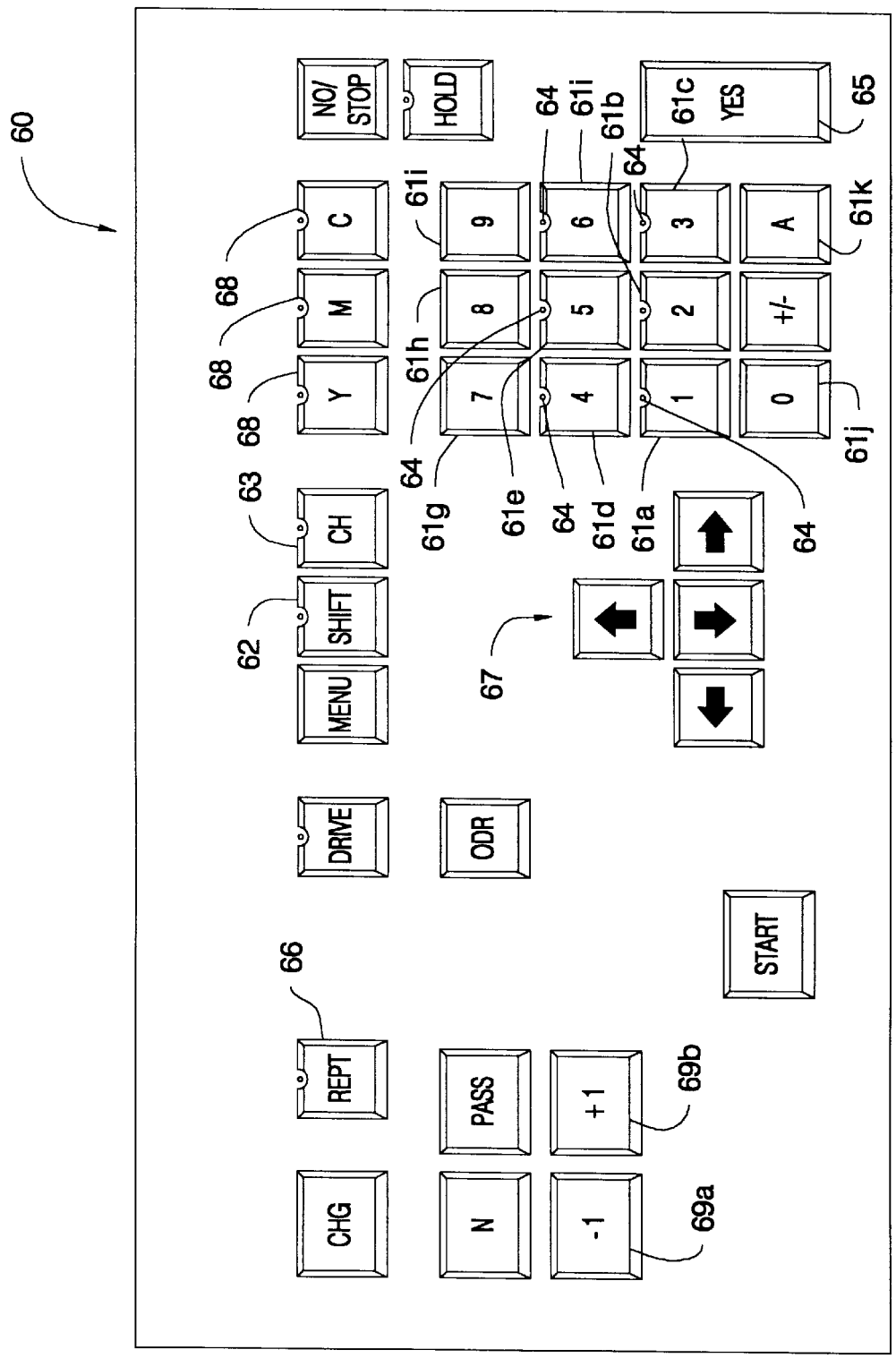
FIG. 9 is a plan view of another keyboard according to the present invention.

In the embodiments described above various modifications may be made without departing from the spirit of the present invention, for example, in the keyboard 60 shown in FIG. 9, each of the "1" key 61a, "2" key 61b, "3" key 61c, "4" key 61d, "5" key 61e, and the "6" key 61f, which are used as image frame selection keys for the 4-frame illustrative pattern and the 6-frame illustrative pattern, has a notch in the central part of the upper edge of its key touch surface to expose the LED 64 as an identification device. Namely, the LED 64 is installed separately from the ten-keys. Each of the LEDs 64 may be disposed, though not illustrated in the vicinity of each key of ten-keys respectively by making the distance between keys a little wider, without making a notch on the key touch surface.

To illustrate an example of a multi-frame illustrative pattern, the b 4-frame illustrative pattern and the 6-frame illustrative pattern have been described here, but it is to be understood that the system with other illustrative patterns and/or other selection keys beside ten-key keypads are within the scope of the present invention.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An image frame selecting device for a photographic printer comprising:

an image processing device for reading image frames of a negative film and for displaying a plurality of image frames in a multi-frame illustrative pattern on a monitor;

an illustrative pattern switching mechanism for changing said multi-frame illustrative pattern;

a plurality of multifunctional selection keys disposed corresponding to the arrangement of each image frame in the multi-frame illustrative pattern, said selection keys being formed of a numerical keypad including at least ten keys;

a selection key control device for assigning a selecting function of the image frames displayed on said monitor to only the selection keys whose positions correspond respectively to those of image frames in the multi-frame illustrative pattern selected by said illustrative pattern switching mechanism;

an identification device installed to identify the selection key assigned to the selecting function by said selection key control device; and an assignment-cancel key for canceling the selecting function assigned to said selection keys, wherein upon activation of the assignment-cancel key, operation of said multifunctional selection keys switches to at least one of numerical data entry and an additional operational function.

2. An image frame selecting device for a photographic printer as defined in claim 1, further comprising a plurality of assignment-cancel keys for canceling the selecting function assigned to said selection keys, wherein upon activation of one of the assignment-cancel keys, operation of said multifunctional selection keys switches to at least one of numerical data entry and an additional operational function depending on which of the assignment-cancel keys is selected.

3. An image frame selecting device for a photographic printer as claimed in claim 1, wherein said identification device is mounted on said selection key.

4. An image frame selecting device for a photographic printer as claimed in claim 1, wherein said identification device is disposed in the vicinity of said selection key.

* * * * *